United States Patent
Socolsky et al.

(10) Patent No.: US 11,793,127 B2
(45) Date of Patent: Oct. 24, 2023

(54) DRIP EMITTER HAVING MEMBRANE WITH A NON-PLANAR PORTION PROTRUDING INTO REGULATING CHAMBER RECESS

(71) Applicant: Netafim, Ltd., Tel Aviv (IL)

(72) Inventors: Esteban Socolsky, Kibbutz Hatzerim (IL); Ron Keren, Kibbutz Hatzerim (IL)

(73) Assignee: Netafim, Ltd., Tel Aviv (IL)

( * ) Notice: Subject to any disclaimer, the term of this patent is extended or adjusted under 35 U.S.C. 154(b) by 589 days.

(21) Appl. No.: 16/892,622

(22) Filed: Jun. 4, 2020

(65) Prior Publication Data

US 2020/0288653 A1    Sep. 17, 2020

Related U.S. Application Data (63) Continuation of application No. PCT/IB2018/059840, filed on Dec. 10, 2018.

(60) Provisional application No. 62/597,710, filed on Dec. 12, 2017.

(51) Int. Cl.
*A01G 25/02* (2006.01)
*A01G 25/00* (2006.01)
*F16K 21/02* (2006.01)

(52) U.S. Cl.
CPC ...... *A01G 25/023* (2013.01); *A01G 2025/006* (2013.01); *F16K 21/02* (2013.01); *Y10T 137/7836* (2015.04)

(58) Field of Classification Search
CPC ............ A01G 25/023; A01G 2025/006; F16K 21/02; Y10T 137/7836
See application file for complete search history.

(56) References Cited

U.S. PATENT DOCUMENTS

| | | |
|---|---|---|
| 4,210,287 A | 7/1980 | Mehoudar |
| 5,183,208 A | 2/1993 | Cohen |
| 5,294,058 A | 3/1994 | Einav |
| 2006/0237561 A1 | 10/2006 | Park et al. |
| 2009/0302127 A1 | 12/2009 | Lutzki et al. |
| 2012/0097254 A1 | 4/2012 | Cohen |
| 2014/0110506 A1 | 4/2014 | Mavrakis et al. |
| 2015/0090815 A1 | 4/2015 | Akritanakis |
| 2016/0295816 A1 | 10/2016 | Kidachi |
| 2018/0098514 A1 | 4/2018 | Socolsky et al. |
| 2018/0359962 A1 | 12/2018 | Noguchi |

FOREIGN PATENT DOCUMENTS

| | | | |
|---|---|---|---|
| JP | WO2017/098858 | * 6/2017 | |
| WO | WO 95/29761 | 11/1995 | |
| WO | WO-2017057034 A1 | * 4/2017 | ............ A01G 25/02 |

(Continued)

OTHER PUBLICATIONS

International Search Report dated Jul. 29, 2019, in International (PCT) application (No. PCT/IB2018/059840).

(Continued)

*Primary Examiner* — Qingzhang Zhou (74) *Attorney, Agent, or Firm* — Womble Bond Dickinson (US) LLP (57) ABSTRACT

A drip emitter has a flexible membrane for regulating a flow of liquid exiting the emitter. The membrane, in a non-stressed or non-flexed state into a regulating chamber of the emitter, includes a non-planar portion.

24 Claims, 5 Drawing Sheets

(56) References Cited

FOREIGN PATENT DOCUMENTS

| WO | WO 2017/103926 | 6/2017 | | |
|---|---|---|---|---|
| WO | WO-2017103926 A1 | * | 6/2017 | ........... A01G 25/023 |

OTHER PUBLICATIONS

Written Opinion dated Jul. 29, 2019, in International (PCT) application (No. PCT/IB2018/059840).

* cited by examiner

DRIP EMITTER HAVING MEMBRANE WITH A NON-PLANAR PORTION PROTRUDING INTO REGULATING CHAMBER RECESS

RELATED APPLICATIONS

This is a Bypass Continuation of International Application No. PCT/IB2018/059840 filed Dec. 10, 2018 and published as WO 2019/116206A2. Priority is claimed to. U.S. Provisional Patent Application No. 62/597,701, filed Dec. 12, 2017. The contents of the aforementioned applications are incorporated by reference in their entirety.

BACKGROUND

Membranes can be used for various purposes in irrigation drip emitters in connection to waterways formed in the emitter. For example, a membrane may be used for controlling the flow rate of water discharged by the emitter, for sealing between parts of the emitter, for defining valves in the emitter and/or for defining flow-paths within the emitter.

In control of flow rate, for example, the membrane operates to control liquid flow out of the emitter so that it is substantially independent of pressure at an inlet of the emitter for a range of pressures typically encountered in irrigation applications. For this purpose, the membrane is normally located between inlet and outlet waterways of the emitter and in response to increase in pressure of the entering water undergoes distortion that operates to increase resistance to liquid flow through and out of the emitter.

U.S. Pat. No. 4,210,287 discloses an emitter unit provided with a resiliently flexible membrane, which is releasably retained within a body member so as to serve a double function. On the one hand, whilst being exposed to the irrigation flow pressure in the conduit to serve in exercising differential pressure control, and, on the other hand, to define, with respect to a flow restricting waterway groove formed in the body member, a flow-restricting waterway flow-path.

Provision of drip emitters that are less expensive is desirable and one way of providing same may be to design a drip emitter from a single part, which thus requires less or substantially no assembly steps to be completed for use. In particular, provision of such a single part drip emitter may be beneficial in drip emitters that are made from different type materials, such as pressure regulated drip emitters that typically include a plastic body and an elastic membrane for assisting in the pressure regulation.

SUMMARY

The following embodiments and aspects thereof are described and illustrated in conjunction with systems, tools and methods which are meant to be exemplary and illustrative, not limiting in scope.

In an embodiment there is provided a flexible membrane for a drip emitter, wherein the membrane in a non-stressed or non-flexed state comprises a non-planar portion.

Such membrane may be suitable for use in drip emitters formed in a bi-component molding process where the membrane may be formed from a material that is different to material(s) in remaining parts of the emitter.

Preferably, such drip emitters may be formed form two parts where the membrane is formed in a first part (possibly within a frame of the first part) and the other second part may be formed with a recess that when overlaid by the membrane forms a regulating chamber of the emitter.

Possibly, the non-planar portion comprises a generally free-form shape and/or it comprises a generally plane curve shape, preferably a smooth plane curve shape.

In an embodiment there is also or in addition provided a drip emitter comprising body and flap members connected at a hinge, the body and/or flap members being arranged to be pivoted about the hinge towards each other to form an operative state of the emitter suitable for performing drip irrigation, wherein when first pivoting the body and/or flap members one towards the other to form the operative state, and then leaving the members free to flex back away from each other to reach a relative open state; an included angle formed between the two members in the relative open state is configured to be less than about 35 degrees, and preferably less than about 30 degrees.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 1:
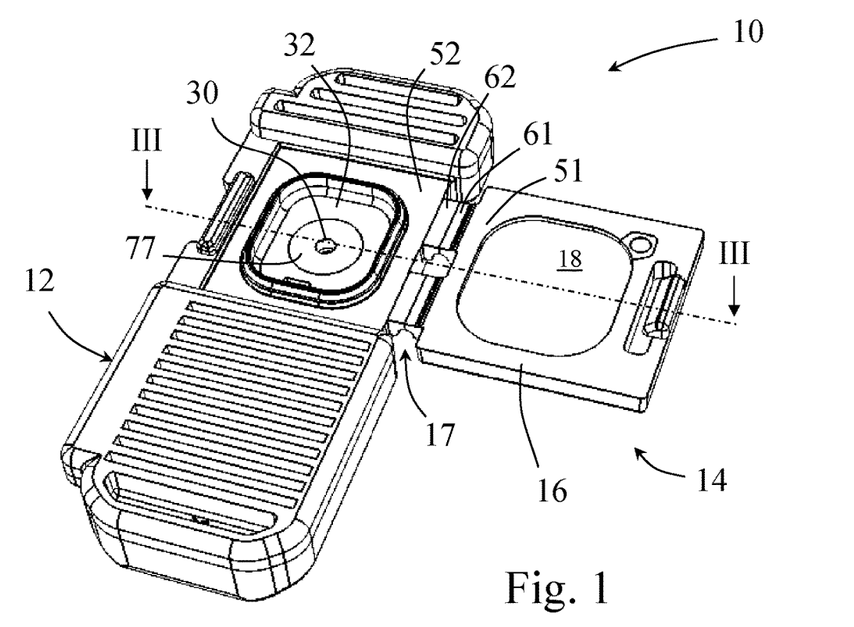
FIG. 1 schematically shows a drip emitter in accordance with an embodiment of the present invention in an open state.
Figure 2A:
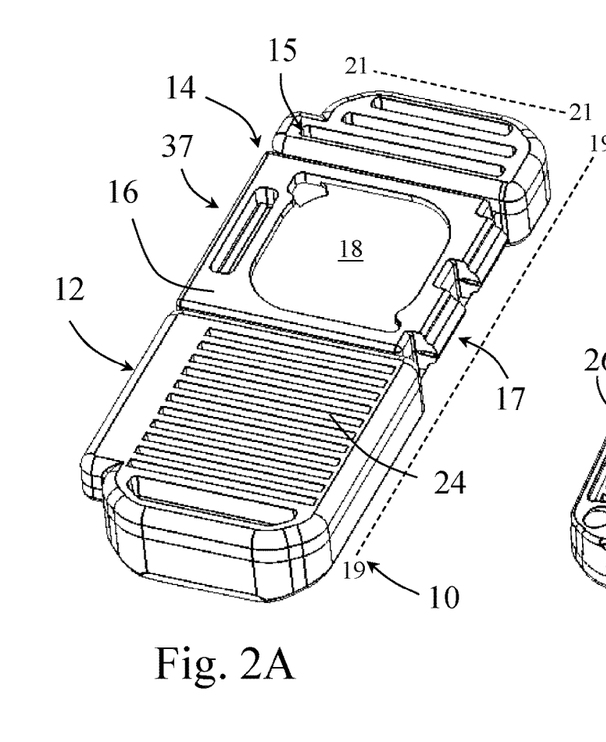
FIGS. 2A and 2B schematically show a closed operative state of the drip emitter of FIG. 1, from respective bottom and upper sides.
Figure 2B:
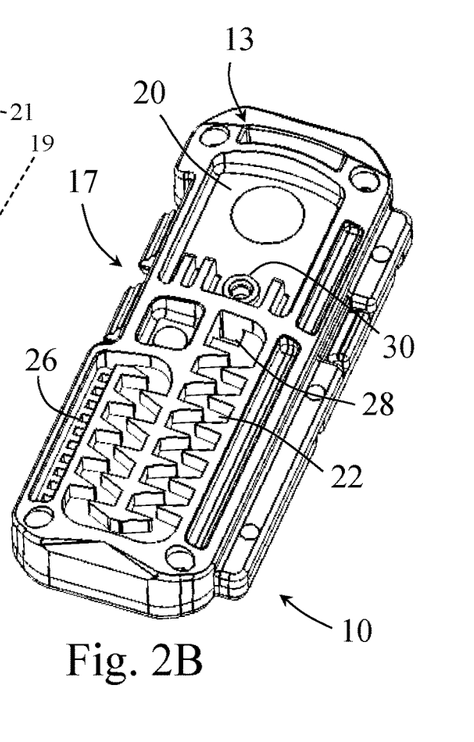

Attention is first drawn to FIGS. 1, 2A and 2B illustrating an embodiment of a drip emitter 10 of the invention in respective open (FIG. 1) and closed (FIGS. 2A and 2B) states. Emitter 10 has a body 12 and a flap 14 that are both connected at a hinge 17 to form a housing 7 of the emitter. Body 12 and flap 14 include respective body and flap regions 52, 51 on opposing sides of hinge 17—and pivoting of flap 14 and/or body 12 towards each other about hinge 17 forms an operative closed state of the emitter suitable for use.

In the operative state, body region 52 and flap region 51 are brought closer together to form an abutment or close to abutment relationship. An emitter may be secured in such closed operative state by respective fixation means 37 located both on flap 14 and body 12, which are configured to engage each other to maintain/secure the emitter in its closed operative state.

Body 12 may be formed by injection molding from Polyolefin materials typically used in production of drip emitters, such as preferably Polyethylene (PE). Flap 14 may include a frame 16 formed possibly from similar, preferably identical, material as body 12, and possibly molded together with body 12 during its production to optionally form hinge 17 as a living hinge.

In accordance with an aspect of the invention, emitter 10 may include a diaphragm or membrane 18 located within frame 16. Membrane 18 may preferably be formed within frame 16 during the production of the emitter by injection molding, preferably from a more flexible and/or elastic material than body 12, possibly from a thermoplastic elastomer (TPE). In various embodiments of the invention, the frame may be injected prior to the membrane that is then molded thereupon; or the membrane may be injected prior to the frame that is then molded thereupon, or the frame and membrane may be molded substantially together at the same time.

The emitter parts/elements, e.g., membrane, body and flap—may be formed in the same mold apparatus by injecting each time one or more of the parts into cavities within the mold. Possibly such mold may include moving segments forming during a molding procedure various cavities into which molten material forming the various emitter parts/elements may be injected. Thus, a molding technology possibly utilized for forming at least certain emitter embodiments of the invention—may be considered as bi-component or multi-component molding technology—where several components/parts of an emitter may be molded in a single mold apparatus. In some cases, also single component molding technology may be used, where a mold may be designed to include a single cavity into which all parts of the emitter may be injected. Martials suitable for such single component option may include TPE materials e.g. TPE of SEBS type.

Emitter 10 in its closed operative state includes an outer side 13 (see FIG. 2B) that is configured to attach possibly by heat bonding (or the like) to an inner face of an irrigation pipe (not shown); and an inner side 15 (see FIG. 2A) that is configured to face into the pipe to be exposed to pressurized liquid and/or substances flowing through the pipe.

Figure 3:
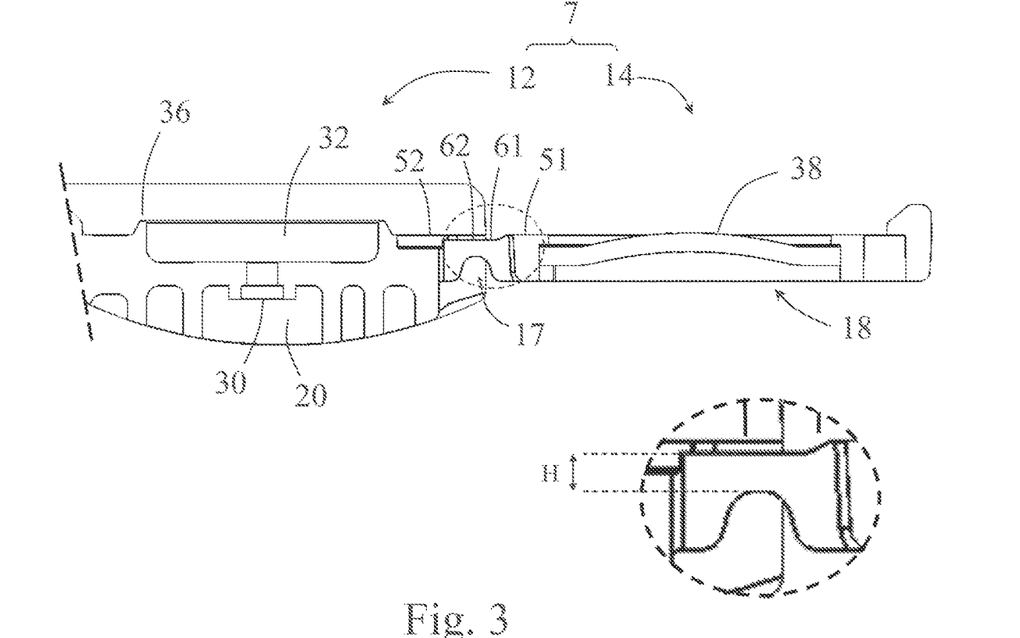
FIG. 3 schematically shows a cross sectional view of a drip emitter generally similar to that in FIG. 1 in its open state.
Figure 4A:
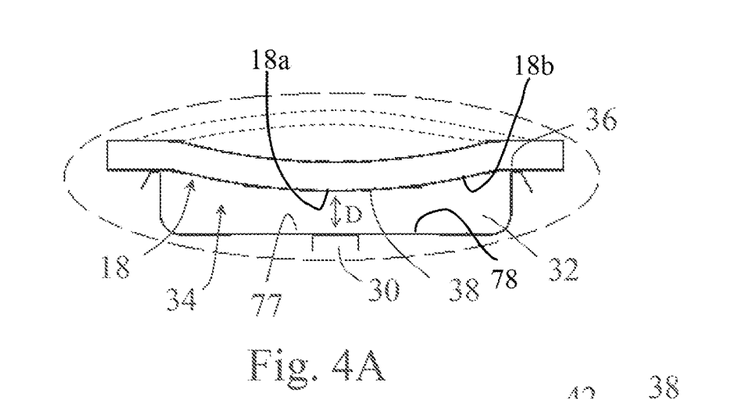
FIGS. 4A and 4B schematically show cross sectional views, respectively, of a regulating chamber of an embodiment of a drip emitter of the invention and a molding step for forming a membrane embodiment defining said chamber.
Figure 4B:
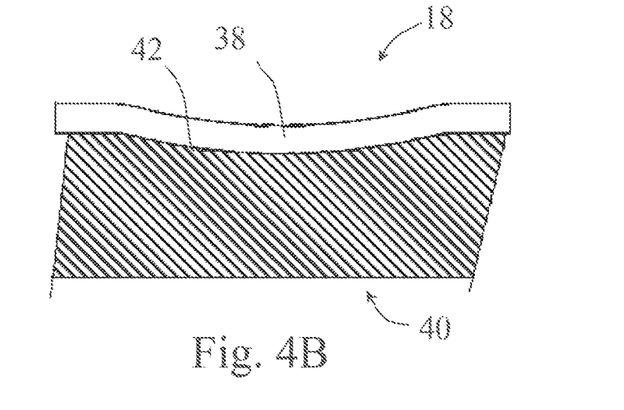

The embodiment of membrane 18 illustrated in FIGS. 3, 4A and 4B is seen including a possible convex bulging portion 38, which in the closed operative state of the emitter (see FIG. 4A) is configured to slightly bulge into recess 32 while remaining spaced apart from the exit, above the bottom surface 78 of the regulating chamber 34. FIG. 4B provides a view of a mold segment 40 that may be used for forming the membrane embodiment illustrated in FIGS. 3 and 4A.

Labyrinth 22 has an ending 28 via which liquid can pass back downwards into a recess 32 (see recess 32 e.g. in FIGS. 1 and 3) that forms with membrane 18 (in a closed operative state of the emitter) a regulating chamber 34 of the emitter (see, e.g., regulating chamber 34 in FIG. 4A). From regulating chamber 34/recess 32—the liquid flows back upwards via an exit 30 of the emitter into exit pool 20 and from there onwards downstream to exit the pipe (via an aperture, slit, or the like) in order to transfer substances to an ambient environment (such as soil or the like) outside of such pipe. Such transfer of substances (e.g. liquids nutrients or the like) may be for irrigation purposes or any other suitable required purpose.

Although flap 14 is illustrated herein as including, inter alia, elements such as membrane 18 and frame 16—in various embodiments, flap 14 may be arranged to include additional elements of the emitter. For example, flap 14 may be configured to include also inlet 24 and/or possibly substantially most of the emitter's elements forming, belonging and/or associated to the emitter's inner side 15. In addition, hinge 17 herein illustrated as extending along a longitudinal side extension 19 of the emitter, may be arranged to extend along a shorter lateral extension 21 of the emitter (see extensions 19, 21 indicated in FIG. 2A).

Attention is additionally drawn to FIGS. 3, 4A and 4B. In FIG. 3 emitter 10 is illustrated in its open non-operative state (as in FIG. 1) prior to being urged to its closed operative state seen in FIG. 2 by rotating flap 14 and/or body 12 about hinge 17. Recess 32 may be bound by a raised rim 36 (see also FIG. 1) that is formed about its perimeter and that extends above body region 52. FIG. 4A is a section of the emitter in its closed operative state illustrating the emitter's regulating chamber 34 that is formed by membrane 18 being pressed against rim 36 to overlay/seal recess 32.

The embodiment of membrane 18 illustrated in FIGS. 3, 4A and 4B is seen including a possible convex bulging portion 38, which in the closed operative state of the emitter (see FIG. 4A) is configured to slightly bulge into recess 32. FIG. 4B provides a view of a mold segment 40 that may be used for forming the membrane embodiment illustrated in FIGS. 3 and 4A.

Mold segment 40 seen in FIG. 4B may be a segment that can be used during an injection molding process of emitter 10. Mold segment 40 may possibly be a movable mold segment that may be moved to a position within a mold forming the emitter—after a prior injection molding phase in which frame 16 surrounding the membrane was formed by injection molding. In certain cases, mold segment 40 may be a static mold segment as in the illustrated examples—where an opposing mold segment (not shown) may be movable to form the cavity for the membrane.

It is noted that other partitions, mold parts (and the like) may typically be used in a molding process forming membrane 18, however these have not been illustrated in FIG. 4B. In addition, mold segment 40 may extend about further portions surrounding a cavity in which membrane 18 illustrated in FIG. 4B is formed by injection molding.

Mold segment 40 includes a face 42 that at least a portion of the molten material forming membrane 18 can meet during the injection molding phase of the membrane. Face 42 as here illustrated includes a concave portion and molten material filling a mold cavity including face 42 will be urged to form convex portion 38 of the membrane as it meets the concave area of face 42. Thus, membrane 18 in its normal unstressed state after injection molding may be configured to embody a geometry including convex portion 38.

With attention drawn back to FIG. 4A, membrane 18 in the closed operative state of the emitter is accordingly seen including convex portion 38 slightly bulging into recess 32 as it forms the emitter's regulating chamber 34. A central area 18a of the membrane's convex portion 38 is located opposite the exit 30 and protrudes further into the regulating chamber 34 than a peripheral area 18b thereof. More particularly, in the closed operative state, the central area 18a of the membrane's convex portion 38 is spaced apart from the exit 30 and above a bottom surface 78 of the regulating chamber 34. It is noted that membrane 18 in the state seen in FIG. 4A may be slightly stressed away from cavity 32 due its possible bearing pressed engagement against raised rim 36 that surrounds cavity 32. In any case, in at least certain emitter/membrane embodiments—the bulging condition of membrane 18 into cavity 32 may be due to membrane being urged to maintain and/or re-assume its unstressed state that in certain cases includes convex/bulging portion 38.

The pressing engagement of the membrane against raised rim 36 may be required in certain embodiments in order to seal the periphery of the regulating chamber against rim 36 so that the regulating chamber can function properly for regulating the flow of liquid exiting emitter 10.

Such pressing engagement of membranes that may be required in some cases for effectively sealing a cavity of a regulating chamber, may result in some membranes being urged to possibly flex away from such cavity. In membranes lacking a convex portion (such as portion 38), this may possibly result in such membranes being urged to flex to a position where then may even bulge away from their respective cavities to an extent schematically illustrated by the 'dashed lines' in FIG. 4A.

If this was to occur, the effectiveness of such membranes in regulating liquid flow through an emitter may be harmed, since effective flow regulation typically occurs as a distance D, e.g., decreases between the membrane and a face of cavity 32 adjacent exit 30 as the membrane flexes inwards due to rise in pressure liquid in the pipe. Thus, membranes starting off from a position as that generally illustrated by the 'dashed lines' in FIG. 4A, may initially be required to flex back towards a state where they start to bulge into cavity 32 before effective regulation can commence.

In at least certain embodiments of the invention, the slight natural bulging condition of membrane 18 into cavity 32 due to convex portion 38 may assist in mitigating such outcome as discussed. Since also in cases where the membrane may be urged to flex away from the cavity, the pre-defined bulging of the membrane (in its substantial unstressed condition) into cavity 32, may position the membrane at a better starting point for early entry into effective liquid flow regulation upon start of rise in liquid pressure in the pipe.

Figure 5A:
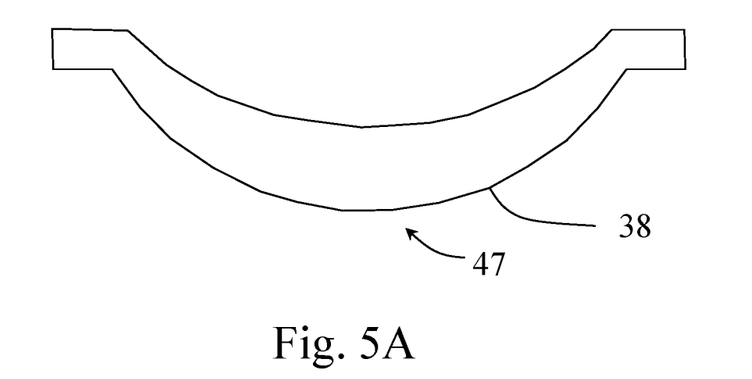
FIGS. 5A to 5C schematically show cross sectional views of various membrane embodiments of the invention.
Figure 5B:
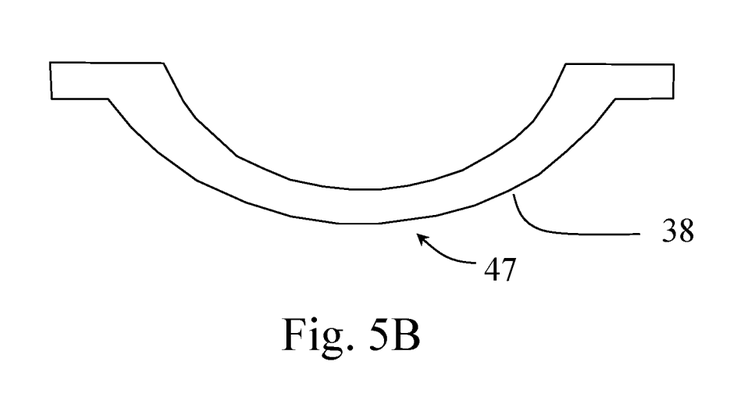
Figure 5C:
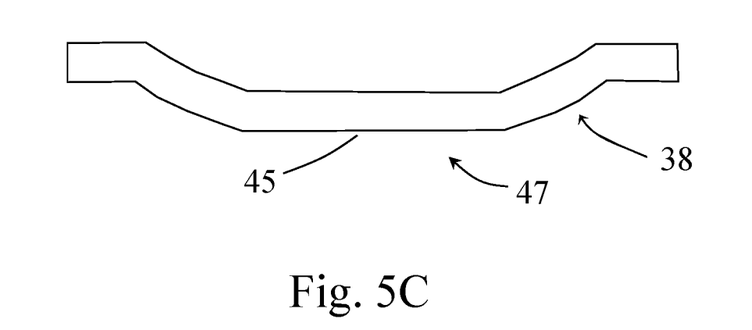

With attention drawn to FIGS. 5A to 5C various membrane embodiments are shown possibly used in drip emitters generally similar to those in e.g. FIGS. 1 and 2. In FIGS. 5A and 5B, the membranes are seen having varying thickness in convex portion 38 as it bulges towards an apex 47 of the membrane configured to be placed generally above exit 30 of the emitter in the emitter's operative state. In FIG. 5A the thickness appears to increase while in FIG. 5B to decrease as convex portion 38 reaches closer to apex 47.

In FIG. 5C, a membrane embodiment is seen including an upper generally flattened area 45 generally at the membrane's apex 47. Such flattened area 45 in certain cases, may assist in facilitating effective pressure regulation in a drip emitter including such membrane, by defining generally two parallel planes, one area 45 and the other a region 77 adjacent exit 30 of the emitter—between which outward flow regulation is controlled as distance D decreases or increases.

Figure 6A:
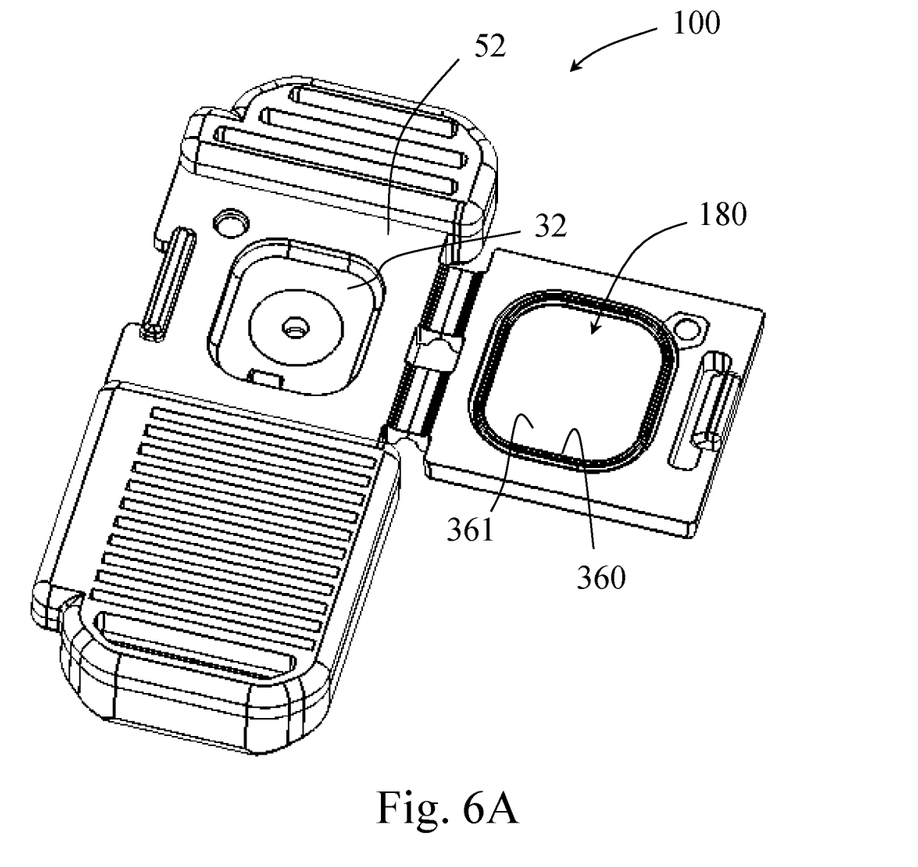
FIGS. 6A and 6B schematically show, respectively, an embodiment of a drip emitter and a membrane embodiment possibly used in this drip emitter.
Figure 6B:
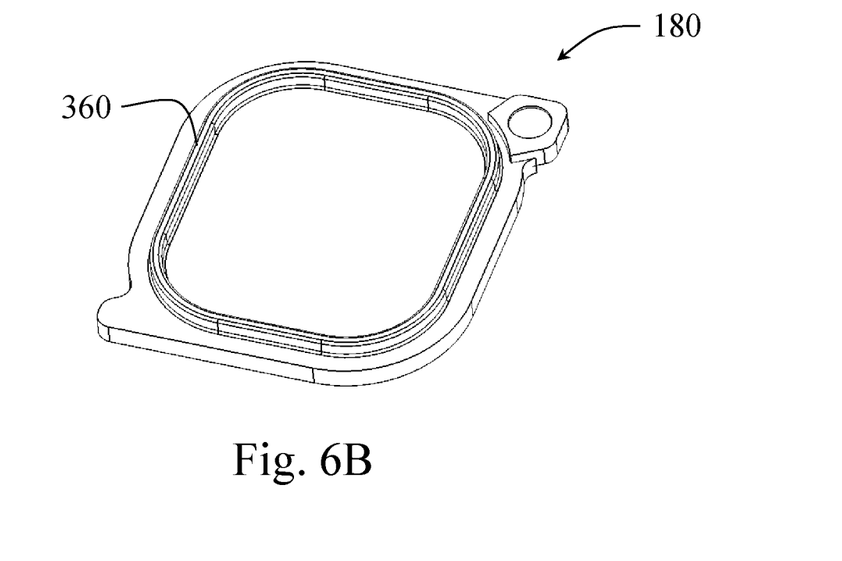

Attention is drawn to FIGS. 6A and 6B illustrating an embodiment of a drip emitter 100 that may differ from emitter 10 in absence of the raised rim around recess 32 upon which the sealing of the recess in the operative state of emitter 10 may possibly occur. Emitter 100 may further differ from the former emitter (emitter 10) in inclusion of a membrane embodiment 180 that may comprise a raised peripheral wall 360 on its side that faces recess 32 in the emitter's operative state. Peripheral wall 360 may be arranged to project up from an otherwise generally planar face 361 of the membrane. Thus, in an aspect of the invention, sealing of the regulating chamber of emitter 100 may be embodied by peripheral wall 360 of membrane 180 being arranged to press against a surface possibly constituting and/or including body region 52 that surrounds recess 32 in the emitter's operative state.

In certain embodiments (not shown) emitter 100 may include a raised rim (such as rim 36) around its recess 32 upon which the sealing of the recess in the operative state of emitter 10 may possibly occur, and such sealing in emitter 100 may include the membrane's peripheral wall 360 being arranged to at least partially press against the raised rim.

Figure 7A:
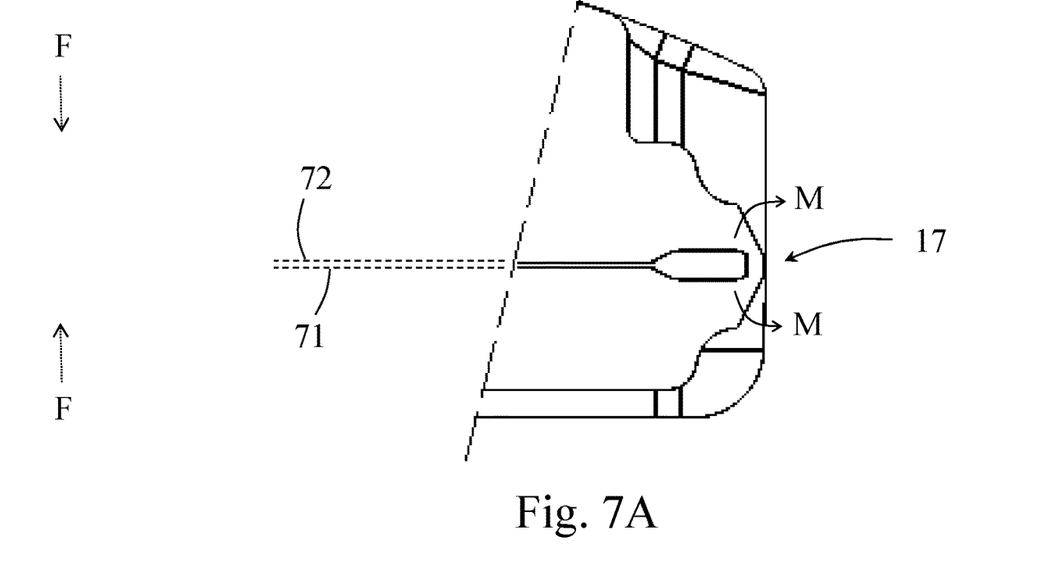
FIGS. 7A and 7B schematically show a cross sectional view of a hinge area of an embodiment of a drip emitter generally similar to those in FIG. 1 to 3 or 6 in respective closed and relative open states.
Figure 7B:
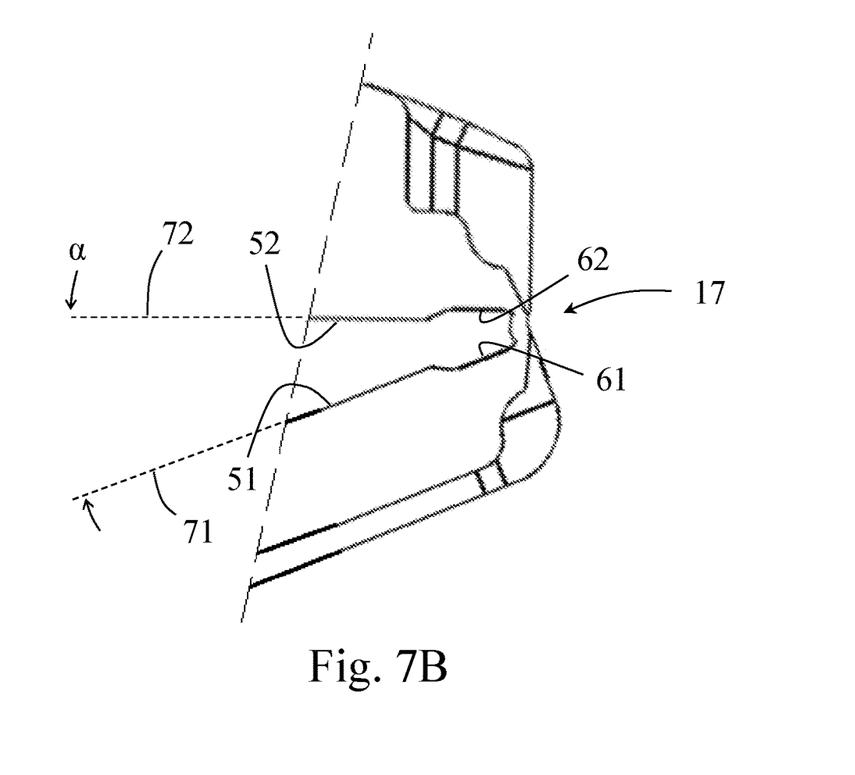

Attention is drawn to FIGS. 7A and 7B each illustrating a similar cross sectional view of an emitter embodiment (generally similar e g to emitters 10 or 100). These views illustrate an area of the emitter adjacent hinge 17. In FIG. 7A the emitter is seen in its closed operative state where e.g. regions 51, 52 are placed adjacently each other, and in FIG. 7B the emitter is seen in a relative slightly open state where e.g. the regions 51, 52 are slightly spaced apart about hinge 17. Also seen and indicated in these figures (as also in FIG. 1) are body and flap depressions 62, 61 formed, respectively, on opposing sides of hinge 17 adjacent body and flap regions 52, 51.

In the view of FIG. 7A respective planes 71, 72 extending from and/or including regions 51, 52 are marked by the dashed lines. Preferably, planes 71, 72 extend and/or include areas of regions 51, 52 most proximal to hinge 17, possibly adjacent depressions 61, 62; to thus provide a measure of an angle α representative of an opening angle exhibited at or adjacent to the hinge 17. In FIG. 7A these planes 71 72 are seen generally parallel to each other. Such condition may be generally representative of a closed operative state of an emitter. In the view of FIG. 7B these respective 'dashed' marked planes 71, 72 are seen spaced apart about hinge 17 forming an angle α greater than "zero".

Hinge 17 is designed to guide flap 14 and body 12 towards each other to form the emitter's operative closed state where, inter alia, regions 51, 52 are placed in abutting or near abutting relation close together as seen in FIG. 7A. In this operative state, the flap and body are configured to, respectively, place membrane 18 in pressing engagement against rim 36 (as in emitter 10) and/or peripheral wall 360 of membrane 180 in pressing engagement against an area surrounding recess 32 (as in emitter 100)—in order to seal the emitter's regulating chamber 34—while the closed operative state can be maintained by the emitter's fixation means 37.

In certain embodiments, the emitter in areas at or adjacent hinge 17—may be configured once forming the closed operative state—to impose limited (or substantially no) moment forces M acting to urge the flap and body away from each other about the hinge towards a more open state.

In the illustrated embodiments, such moment forces M if exceeding certain values may act e.g. to distort/bias slightly the emitter's body and flap away from each other (while flap and body are maintained fixed together by fixation means 37). Such distortion/bias, inter alia, also in regions 51, 52—may possibly reduce the pressing engagement between membrane 18 and rim 36 (in emitter 10) and/or wall 360 against area around recess 32 (in emitter 100) and consequently possibly harm the sealing of the regulating chamber 34 that may be required for proper pressure regulation of the emitter.

Such formation of moment forces M may at least partially be mitigated in certain embodiments, by hinge 17 being designed to undergo relative large plastic deformations while flap 14 and/or base 12 are first pivoted towards each other about the hinge. This first pivoting of the base and/or flap towards each other may be from a state/condition of the emitter (such as that seen in FIG. 3) representative of the emitter after e.g. the base, flap and membrane have been molded by injection molding. This first pivoting may be formed within the mold prior to extraction of the molded emitter from the mold. In some cases, this stage of first pivoting may be performed after the molded emitter exited the mold in the state generally seen in FIG. 3.

Relative large plastic deformations occurring within the hinge—may consequently limit presence of substantial elastic forces within (or in the region of) the hinge that may contribute to formation of the discussed moment forces M. Such hinge configuration designed to undergo large plastic deformation may consequently reduce likelihood of harm to the sealing of the regulating chamber 34.

In some embodiments (possibly combinable with the former), an emitter with a hinge region 17 designed for reduced formation of the discussed moment forces M may be defined by the following test. An emitter with no prior pivoting of the flap and/or base about hinge may first be urged to a position generally similar to that seen in FIG. 7A where the regions 51, 52 generally abut or are in close abutment relation. In the discussed test, the urging of the flap and/or base about the hinge may be executed by applying forces F acting to urge this closing movement at a distal location to the hinge possibly adjacent areas of the emitter proximal to where cooperating members of the fixations means are present on the body and flap. Without having the fixation means 37 fix the base to flap, these both elements are then left to flex back away from each other to a position generally illustrated in FIG. 7B resulting in angle α formed between planes 71, 72. The biasing force urging this flexing of the base and flap away from each other may be substantially due to the moment forces M present in the hinge.

In tests performed by the inventors it has been found that an emitter exhibiting a moment force M less likely to undermine the sealing of the regulating chamber—is observed to form an angle α less than about 35 degrees and preferably less than about 30 degrees. The above angle criteria of α may be taken as representative to the amount of plastic deformation subjected to hinge 17 and hence the residual elastic deformation left in the hinge 17 after such plastic deformation.

In some embodiments (possibly combinable with one or more of the former hinge embodiments), relative small formation of the above discussed moment forces M may be defined by a hinge 17 having a minimal thickness H generally less than about 0.4 millimeter and preferably larger than about 0.15 millimeters. See thickness H indicated in the encircled section at the lower right-hand side of FIG. 3.

In yet a further embodiment (possibly combinable with one or more of the former hinge embodiments), presence of the depressions 61, 62 adjacent the hinge may assist in improving placement of the regions 51, 52 adjacent to each other in the closed operative state of the emitter. These depressions 61, 62 identifiable also in the emitter's closed state, space the regions 51, 52 from hinge 17 and hence limit the moment forces M that may arise due to materials adjacent to the hinge being made to meet each other. In the shown example, these depressions 61, 62 are shown on both sides of the hinge 17, however in certain embodiments, presence of only one of the depressions 61 or 62 may be sufficient in mitigating the discussed formation of moment forces M and consequently the mentioned outcome of harm to the sealing of the regulating chamber.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Furthermore, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

What is claimed is:

1. A drip emitter comprising:
   an inlet;
   a regulating chamber having a flexible membrane for regulating a flow of liquid exiting the emitter, and an exit through which liquid in the regulating chamber can be emitted out of the emitter;
   wherein:
   the membrane comprises a non-planar portion even in a non-flexed state of the membrane, the non-planar portion surrounding and/or overlaying the regulating chamber;
   in said non-flexed state, a central area of the membrane's non-planar portion is located opposite the exit and protrudes further into the regulating chamber than a peripheral area thereof; and
   in said non-flexed state, the central area of the membrane's non-planar portion is spaced apart from the exit and above a bottom surface of the regulating chamber.

2. The drip emitter of claim 1, wherein the non-planar portion is a convex portion.

3. The drip emitter of claim 1, wherein the non-planar portion comprises a peripheral raised wall, projecting up from an otherwise generally planar face.

4. The drip emitter according to claim 1, comprising:
a first part comprising a recess; and
a second part comprising the membrane; wherein:
the second part is hingedly connected to the first part, and configured to be pivoted towards the first part to form an operative state of the emitter suitable for irrigation; and
in the operative state, at least a portion of the membrane covers the recess to form the regulating chamber of the emitter.

5. The drip emitter according to claim 4, wherein:
the recess is bounded by a raised rim that surrounds the recess at its periphery; and
the membrane is pressed against the raised rim to substantially seal the recess and the regulating chamber at the raised rim.

6. The drip emitter according to claim 5, wherein in both the operative state and also when the emitter is not exposed to external pressure at its inlet, at least a portion of the non-planar portion of the membrane protrudes into the recess.

7. The drip emitter according to claim 1, wherein:
the recess is bounded by a raised rim that surrounds the recess at its periphery; and
the membrane is pressed against the raised rim to substantially seal the recess and the regulating chamber at the raised rim.

8. The drip emitter according to claim 7, wherein:
the non-planar portion of the membrane is arranged to bulge towards the exit; and
the non-planar portion comprises a flattened area at an area opposite the exit.

9. The drip emitter according to claim 8, wherein the flattened area of the membrane and an area of the recess surrounding the exit are generally parallel one to the other, at least in a non-flexed state of the membrane.

10. The drip emitter according to claim 1, comprising body and flap members connected at a hinge, the body member comprising a recess and the flap member comprising said membrane.

11. The drip emitter according to claim 10, wherein an operative state of the emitter is formed by pivoting the body member and/or flap member one towards the other about the hinge so that at least an interface region of the body member faces at least an interface region of the flap member, and the non-planar portion protrudes into the recess, in said non-flexed state of the membrane.

12. The drip emitter according to claim 11, wherein the hinge is configured to undergo substantial plastic deformation when first pivoting the body and/or flap members one towards the other to form the emitter's operative state.

13. The drip emitter according to claim 11, wherein when first pivoting the body and/or flap members one towards the other to form the emitter's operative state, and then leaving the members free to flex back away from each other to reach a relative open state; an included angle formed between the flap member and the body member, in the relative open state, is less than about 35 degrees.

14. The drip emitter according to claim 13, wherein the included angle is measured between imaginary planes passing through and/or including areas of the interface regions of the body and flap members, which interface regions adjacent the hinge.

15. The drip emitter according to claim 11, wherein:
the body member comprises a depression between its interface region and the hinge, and/or
the flap member comprises a depression between its interface region and the hinge.

16. The drip emitter according to claim 15, wherein only one of the body or flap members comprises a depression between its interface region and the hinge.

17. The drip emitter according to claim 1, comprising:
a body member and a flap member connected at a hinge; wherein:
the flap member is configured to be pivoted about the hinge and fixed to the body member to form an operative state of the drip emitter suitable for performing drip irrigation; and
when the flap member is pivoted about the hinge towards the body member but is released prior to being fixed to the body member and allowed to flex back away from the body member, an included angle formed between the flap member and the body member is less than 35 degrees.

18. The drip emitter according to claim 17, wherein in the operative state of the emitter, an interface region of the flap member faces an interface region of the body member.

19. The drip emitter according to claim 18, wherein the included angle is measured between imaginary planes passing through and/or including areas of the interface regions of the body and flap members, which areas are adjacent the hinge.

20. The drip emitter according to claim 18, wherein:
the body member comprises a depression between its interface region and the hinge; and/or
the flap member comprises a depression between its interface region and the hinge.

21. The drip emitter according to claim 20, wherein only one of the body member and the flap member comprises a depression between its interface region and the hinge.

22. A drip emitter comprising:
a regulating chamber comprising a recess;
a membrane overlaying the recess; and
an exit formed in the recess for defining a path for liquid flow to exit the regulating chamber; wherein:
the membrane comprises a convex portion;
in a non-flexed state of the membrane, the convex portion protrudes into the recess and bulges towards the exit;
in said non-flexed state, a central area of the membrane's convex portion is located opposite the exit and protrudes further into the regulating chamber than a peripheral area thereof; and
in said non-flexed state, the central area of the membrane's convex portion is spaced apart from the exit and above a bottom surface of the regulating chamber.

23. The drip emitter of claim 22, wherein the membrane comprises a flattened portion opposite the exit.

24. The drip emitter of claim 23, wherein the flattened portion is generally parallel to a region of the recess adjacent the exit, when the membrane is in the non-flexed state.

* * * * *